July 19, 1966   C. H. ANDREWS, JR   3,261,405
AIRCRAFT POWER CONTROL APPARATUS
Filed Feb. 9, 1965
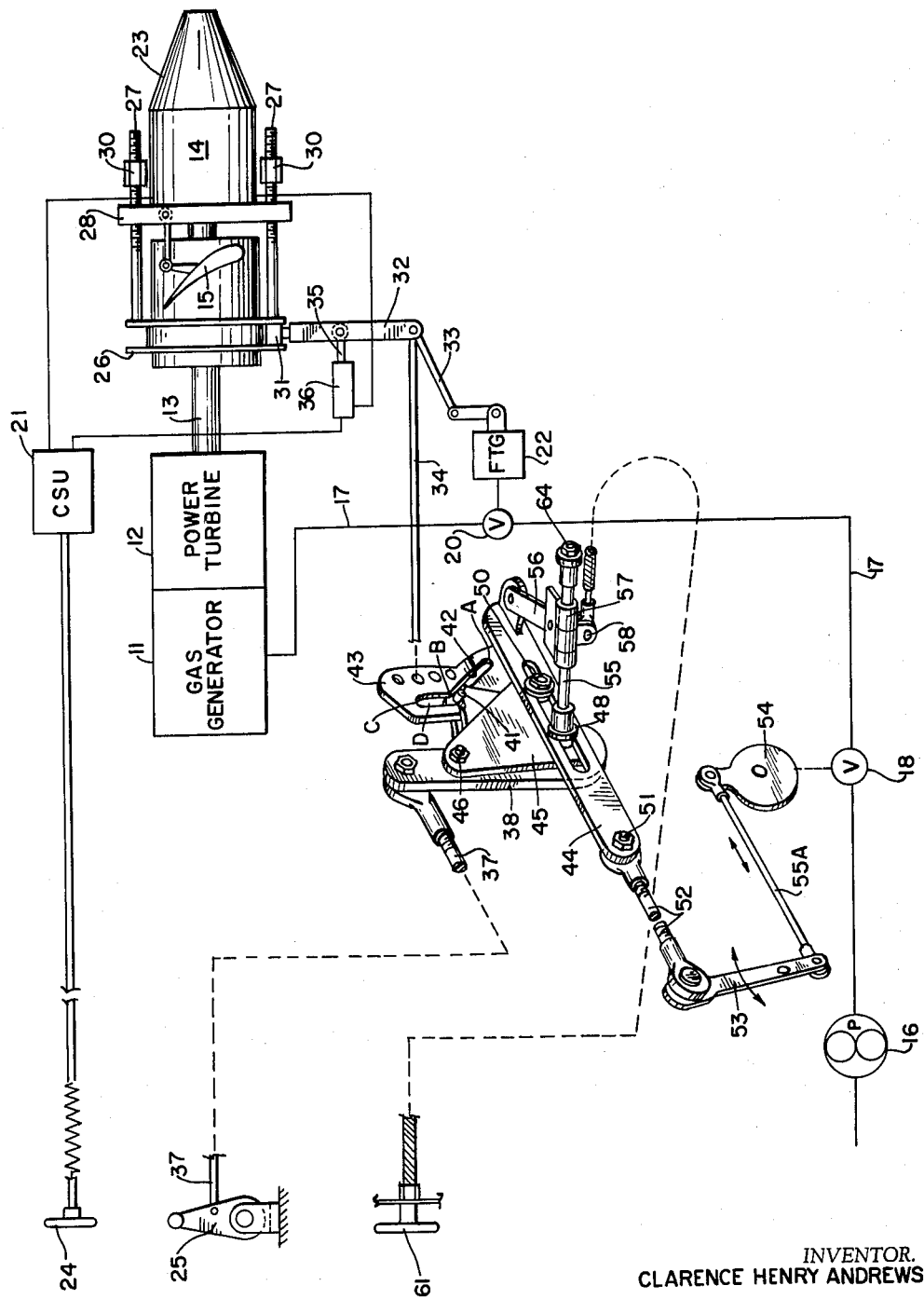
INVENTOR.
CLARENCE HENRY ANDREWS, JR.
BY Darby & Darby
ATTORNEYS

3,261,405
AIRCRAFT POWER CONTROL APPARATUS
Clarence Henry Andrews, Jr., Hagerstown, Md., assignor to Fairchild Hiller Corporation, Hagerstown, Md., a corporation of Maryland
Filed Feb. 9, 1965, Ser. No. 431,347
11 Claims. (Cl. 170—135.74)

This invention relates to aircraft engine control apparatus, and more particularly to blade pitch and fuel control mechanisms used in variable propeller blade pitch free turbine type aircraft engines.

There are two conventional classes of turbo-prop aircraft engines. The first is the fixed shaft type which has a direct linkage, such as reduction gear, connecting the propeller to the compressor and power turbines. Fixed shaft turbine engines are commonly operated at a constant speed. In this mode of operation, the power delivered by the engine is a function of airspeed, propeller speed and propeller blade angle. For a given propeller speed and airspeed, the propeller thrust and/or engine power is a function of propeller blade angle. The power response of the engine is, therefore, a function of the rate-of-change of propeller blade angle.

The second type is the free turbine engine which has no corresponding linkage. In the free turbine engine a gas generator mixes and burns fuel and air, and delivers the hot expanded gases to a power turbine, which is connected to and drives the propeller. The free turbine engine permits a variation in propeller speed at a steady gas generator turbine speed dependent on the load conditions encountered by the propeller. Correspondingly when the gas generator turbine speed is reduced, the gases and/or power delivered to the power turbine are reduced and the propeller speed decreases; within the limitations of its governing controls. The power response of the conventional free turbine engine is a function of the acceleration time of the gas generator section and the power turbine/propeller section.

This inveniton is directed to power control mechanisms for the free turbine type engine.

In free turbine type engines the power developed by the engine depends on both the propeller speed and pitch. Increase in speed at a given pitch increases thrust. Likewise, increase in pitch at a given speed increases thrust. Conversely, decrease in speed or pitch reduces thrust. Below a certain point decrease in either speed or pitch produces drag, and reversal of pitch produces reverse thrust. Reverse thrust is used to brake the aircraft to a rapid halt on landing.

The principal purpose of this invention is to provide a more flexible, reliable and smoother operating control arrangement for propeller speed and pitch in both the flight and ground regimes of operation. It is the intention of this invention to provide for the free turbine engine the capability of operating at an essentially constant power turbine/propeller speed during the landing approach and reverse thrust portion of the landing operation, while retaining the flexibility afforded by independent gas generator and power turbine/propeller speeds during the take-off and cruise modes of flight. When operated in the constant speed mode, the free turbine engine will be afforded the quick power response characteristics of the fixed shaft engine where power response is a function of rate-of-propeller-blade-angle change. The control mechanism disclosed herein is particularly useful in STOL (short take-off and landing) type aircraft.

The invention accomplishes this by providing a smooth transition from cruising conditions to relatively high gas generator and power turbine/propeller speeds and correspondingly low positive blade pitch during the landing approach. Because of the high gas generator and propeller speeds during the approach the pilot can obtain practically instant power response to thrust requirements by simply varying the blade pitch to the desired setting. Thus, if the landing approach is satisfactory and the pilot anticipates completing his landing, he may reverse the thrust by reversing blade pitch just as his aircraft is about to touch down and thereby reduce his land roll to the absolute minimum. The pilot can obtain maximum reverse thrust within one or two seconds, since the propeller and gas generator rotational momentum is high and little inertia need be overcome to achieve maximum generator and propeller speed in the reverse pitch position. The high propeller speeds and corresponding low blade angles used during the landing approach create a substantial amount of aerodynamic drag thus allowing a steep, nose-down approach to landing without an excessive increase in airspeed.

Likewise, if the pilot anticipates that his landing will be balked, as for instance if he sees that he will overshoot the landing area, he may resume flight speed quickly and climb to a suitable altitude for a second approach by advancing the control lever, which increases blade pitch and therefore power, and propeller speed. Since the gas generator and propeller are at a relatively high speed during the approach, very little time is required to achieve maximum thrust under these conditions.

Thus, during the critical phases of the approach and landing, the pilot of an aircraft equipped with this invention may be assured that he can obtain practically instant reaction to the adjustment of his power control lever to either effect a fast landing with an extremely short land roll, or to increase thrust substantially and almost instantly for a fly-by if necessary for a second approach.

It is therefore a principal object of this invention to provide a fuel control mechanism for a free turbine engine capable of achieving substantial thrust variations instantly by coupling propeller speed control devices, blade pitch controllers, and engine fuel controls in a novel way.

It is another object of this invention to provide an engine control linkage for synchronizing the control of gas generator speed with propeller speed and pitch to vary the thrust or drag generated by the engine by changing blade pitch at relatively high propeller speeds.

It is another object of this invention to provide a control apparatus for a free turbine type engine capable of maintaining essentially constant high speed operation of the power-turbine/propeller during the approach-to-landing and landing modes of flight.

It is another object of this invention to provide a control apparatus for a free turbine type engine having a ground operation range of low gas-generator and propeller speeds for normal ground operations to minimize disturbances due to noise.

There and other objects will be apparent from the detailed description and drawing of the invention which follows, wherein the figure is a schematic illustration in partial perspective of a preferred embodiment of the invention.

Referring to the figure, the aircraft engine power plant comprises a gas generator 11 and power turbine 12. Turbine 12 drives propeller shaft 13, which is connected to variable pitch propeller 15. Fuel is fed to gas generator 11 by pump 16 in fuel line 17 through valves 18 and 20. The function of valves 18 and 20 will be described below. On entering the gas generator 11 the fuel is mixed with air and burned and the hot gases are passed through the power turbine 12 to drive the propeller 15.

The speed of power turbine 12 is controlled by two governors, the constant speed unit, commonly referred to as a CSU governor 21, and the fuel topping governor, commonly referred to as an FTG governor 22. Both governors are geared to the power turbine 12, and thus are responsive to speed changes of turbine 12.

Blade pitch of propeller 15 is controlled by a piston-dome assembly generally designated 23. Oil pressure against one side of the piston (not shown) causes the dome 14 to move forward, away from propeller 15, and thereby reduce blade pitch by linkages to propeller 15. The CSU governor 21 regulates this oil pressure to maintain the desired pitch, and thus the desired speed of the power turbine 12. Conversely, a combination of spring and counterweights geared to the propeller 15 increases the blade pitch in the absence of such oil pressure.

This type of propeller is commonly referred to as a single acting type propeller, because the blade pitch regulating fluid operates against only one side of the blade pitch control mechanism. In the specific propeller described herein increase in the oil pressure produced by the CSU governor 21 acts to reduce blade pitch. Opposed to it is a force exerted by a spring and counterweight arrangement geared to propeller 15 which tends to increase pitch when the propeller 15 overspeeds. These forces balance each other out by adjusting blade pitch to an equilibrium position determined by the governor setting.

In the double acting type propeller the blade pitch control fluid operates against both sides of the blade pitch control mechanism. Thus the control fluid either increases or decreases pitch dependent on the propeller speed and governor setting.

While the specific embodiment described herein relates to a free-turbine type engine which employs a single acting type propeller, it should be understood that the control apparatus disclosed herein can be used generally in aircraft using single acting variable pitch type propellers. The reasons for this are discussed below with reference to the operational relationship of the control apparatus and the single acting propeller.

The CSU governor 21, by the pilot's manipulation of the cockpit propeller control 24, may be set to maintain a desired propeller (power turbine) speed. For a given power output from the gas generator 11, the CSU governor 21 controls the propeller speed by means of the above described piston-dome assembly 23 by increasing or decreasing the pitch of the propeller blades. Once the desired speed is set, the CSU governor 21 automatically increases or decreases blade pitch to maintain that selected speed. If the propeller tends to slow down due to an increased load, the CSU governor 21 senses this tendency and corrects for it by decreasing the pitch of the propeller blades to lower the load.

The FTG governor 22 may be set at one of two positions. In the first position, the governor 22 serves as a safety device which reduces fuel to the gas generator 11 should a CSU governor 21 or propeller 15 failure occur allowing the power turbine 12 to exceed its normal operating speed limits. For example, when the FTG governor 22 is set in this first position, the CSU governor 21 may be set to require anywhere from propeller feather position to 100% maximum allowable turbine r.p.m., and the FTG governor 22 would correspondingly be set to reduce fuel to the gas generator 11 if the r.p.m. should exceed 105% of the maximum allowable speed.

The second position for the FTG governor 22 is when the pilot selects what is commonly referred to as the "Beta mode" of operation for the governors 21 and 22. In this operation the pilot resets the FTG governor 22 to the Beta range by retarding his cockpit power lever 25, while at the same time setting the CSU governor 21 to require 100% maximum allowable r.p.m. Resetting of the FTG governor 22 to the Beta range causes governor 22 to control valve 20 located in the engine fuel control section so as to control the fuel feed to the gas generator 11 to limit the power turbine speed to 95% of its maximum allowable speed, regardless of what the CSU governor 21 does in attempting to maintain 100% of that speed.

With the initial retardation of power lever 25 in the first phase of Beta operation gas generator speed is reduced and the CSU governor 21 reduces blade pitch in an attempt to maintain 100% maximum allowable speed power turbine speed. Pitch continues to decrease until a third control element, the follower slip ring 26, comes into play. The follower slip ring 26 is mounted free to move coaxially along the axis of propeller shaft 13 and is connected to dome 14 in a manner so that at an adjustable point while pitch is being reduced, ring 26 will move as a function of the forward movement of dome 14. This connection between ring 26 and dome 14 is made by three equi-angularly spaced rods 27 which are connected at one end to ring 26. The opposite ends of rods 27 pass through a guide collar 28 mounted on dome 14 and are threaded into nuts 30. The position of nuts 30 may be adjusted to vary the points at which ring 26 begins to move with dome 14. As dome 14 and collar 28 move forward, collar 28 contacts nuts 30 and moves follower slip ring 26 at the same speed as the forward movement of dome 14.

Connected to and movable with follower slip ring 26 is slipper block 31 which is pivotally connected to link 32. Link 32 is pivoted at its opposite end to articulated linkage 33 which is connected to FTG governor 22 and to arm 34 which is connected to cockpit power lever 25 through linkages to be described below. Also pivotally connected at an intermediate point along link 32 is rod 35 which connects to and controls valve 36.

In the "Beta" mode of operation the pilot sets the CSU governor 21 to call for 100% maximum power turbine speed and then retards the power lever 25. As described above, retarding of the power lever 25 resets the FTG governor 22 which then controls valve 20 to limit power turbine speed to 95% of maximum allowable speed. The CSU governor 21 senses an underspeed condition and tries to correct for this by reducing blade pitch through forward motion of dome 14. At the preset point when the forward motion of dome 14 moves follower ring 26 and block 31, this movement also moves link 32. Movement of link 32 gradually opens valve 36. Opening of valve 36 drains oil pressure from dome 14 and thereby halts forward motion of dome 14 for any given position of power lever 25 in the Beta control range, thus stabilizing propeller 15 at a given blade angle. A mechanical detent, not shown, is provided for power lever 25 to establish the minimum safe in flight blade angle for propeller 15.

In conventional CSU and FTG governor control systems, the power control lever is normally connected to a double faced cam which has a maximum reverse thrust position and a maximum take off thrust position with an idle position between the two. Also, in the conventional system the "Beta" mode of operation is not engaged until the power lever is retarded below this idle position into the reverse thrust range of operation. Thus the "Beta" mode is not actuated until the pilot has landed his aircraft and commenced his braking operation. As he approaches his landing, the pilot retards his power lever to the minimum safe flight speed position. At this position, the double faced cam is at its idle position, thus producing the minimum gas generator and power turbine speed. At touchdown the pilot must then retard the lever further in order to actuate the "Beta" mode and obtain maximum reverse thrust. Since the fuel control cam must pass through this low idle speed position, the gas generator and power turbine is necessarily slowed to the point where considerable inertia must be overcome before it can be speed up to the maximum reverse thrust condition. This results in a prohibitively long time lapse before maximum reverse thrust can be obtained, thus resulting in a prohibitively long landing roll. Likewise, the pilot's operations in making his landing approach are limited, since he must approach his landing at a relatively low power plant speed which limits his ability to obtain instantaneous high forward thrust should his landing be balked.

This invention remedies this situation by means of a novel fuel control linkage. Power lever 25 is pivotally connected to rod 37 which is pivotally connected at its opposite end to bell crank 38. Crank 38 is pivotally mounted on rod 55 to the aircraft framework. The opposite end of crank 38 carries a cam follower 41 which rides in the dual curved slot 42 of cam 43. Cam 43 is pivoted at another point to the framework and is pivotally connected to rod 34.

Slot 42 of cam 43 includes two curved arcs A–B and B–C. Arc A–B is on a circle having a center on the axis of rod 55. Thus while follower 41 remains in arc A–B, the FTG governor 22 performs its normal function of a safety device to protect against failure of CSU governor 21 or propeller 15. When lever 25 is retarded further to move follower 41 past the "notch" position (point B), this resets FTG governor 22 to the "Beta" range of operation as described above.

Also connected to and pivotal with crank 38 about rod 55 is sliding lever arm 44. Arm 44 is slidably mounted on carrier plate 45 which is fastened in fixed angular relationship to bell crank 38 by bolt 46. Lever arm 44 can be moved linearly via slot 47 with respect to plate 45, but its angular relationship is fixed by means of spaced retainers 48 and 50 which are fastened to plate 45.

Sliding lever arm 44 is pivotally connected by bolt 51 to idler link 52, which pivotally connects at its opposite end to fuel control lever 53. Fuel control lever 53 positions fuel control cam 54 by connection through shaft 55A. Cam 54 controls the amount of fuel admitted to gas generator 11 through valve 18. Counterclockwise motion of lever 53 decreases the fuel input to gas generator 11, and clockwise motion increases such feed.

Thus the retardation of lever 25 rotates crank 38, cam 43, plate 45 and sliding lever arm 44 in a counterclockwise direction. Lever arm 44 is aligned relative to crank 38 to form a straight line with idler link 52 when cam follower 41 is in notch position B of slot 42. Thus the fuel feed to gas generator 11 is decreased when lever 25 is retarder in the range of slot 42 A–B of cam 43, until cam follower 41 reaches the notch position B, at which point further retardation increases fuel feed to the gas generator 11. The amount of fuel fed to gas generator 11 in this manner is controlled by FTG governor 22 which in the "Beta" range maintains sufficient fuel input so as to maintain a relatively high propeller speed not in excess of a value slightly less than the setting of the CSU governor 21.

As pointed out above, the notch position B of cam slot 42 defines the point where the FTG governor 22 is reset for "Beta" operation. Retardation of lever 25 past this notch position varies the power output of the engine as follows:

(1) Valve 18 admits more fuel to gas generator 11, thus maintaining gas generator speed at a relatively high level, limited by the maximum speed allowed by the FTG governor 22 (nominally that which produces 95% of the maximum allowable power turbine speed).

(2) Blade pitch stabilizes according to the position of valve 36, which is controlled by the position of link 32 and follower ring 26. These inputs can be readily adjusted to provide the optimum gas generator speed, propeller speed and blade pitch conditions to yield the most desirable combination for the particular characteristics desired. The approach to landing is made under these conditions.

(3) A point "D" may be selected in the traverse of cam follower 41 in slot 42, at which point blade pitch will be reversed and further retardation of lever 25 will increase thrust in the reverse direction.

If these factors are optimized for flight conditions, it is apparent that the control system will be unsatisfactory for ground or taxiing conditions. Accordingly linkage 56 and its associated mechanisms are provided to adapt the control system for ground conditions. Linkage 56 is pivotally connected to lever arm 44 at the end opposite its connection to idler link 52. The opposite end of linkage 56 is pivotally connected to slide 57 which slides freely on rod 55. Slide 57 has an attachment point 58 for connection to cable 60 which terminates in a control knob 61 in the cockpit.

When the pilot pushes knob 61, this pushes slide 57 toward lever arm 44, and by reason of linkage 56 causes lever arm 44 to shift toward the right (as seen in FIGURE 1). Shifting of lever arm 44 to this position provides a relatively high minimum gas generator and power turbine speed especially suited for flight conditions.

If on the other hand knob 61 is pulled by the pilot, this retracts slide 57 away from lever arm 44 and thus shifts arm 44 toward the left. In this position lever arm 44 is located to provide a lower minimum gas generator speed especially suited for ground taxiing operations.

The basic embodiment of the invention has been described above. The invention of course has various modifications and a variety of additions which may be made to it. For example, idler link 52 may be threadably connected both to sliding lever arm 44 and fuel control lever 53 to permit minute adjustment of the idle position of fuel control lever 53. Also, adjustable stops may be fastened to carrier plate 45 to limit the shift of lever arm 44 and thus provide a second means for varying the minimum speed setting of lever arm 44. Likewise a series of connection points such as the holes 62 in cam 43 may be provided for adjusting the action of the FTG governor 22 in the Beta range of operation.

It is also apparent that the lever arm 44, linkage 56 and slide 57 combination may be replaced by suitable cam or spring coupled arrangements or that the FTG governor 22 and follower slip ring 26 could be replaced by other types of under-speed governors and follow-up mechanisms. Such arrangements would perform essentially in the same manner, i.e. cause the fuel control means to lead the propeller pitch controller, establishing a relatively high power plant idle speed in the Beta range of operation which is increased when the control lever is advanced for take off or retarded for landing.

Therefore while only a preferred embodiment has been shown and described in this application, it is to be understood that the foregoing disclosure is given by way of example only, rather than by way of limitation, that without departing from the invention, the details may be varied within the scope of the discovery, and that the invention comprehends what the subject matter of the appended claims covers.

What is claimed is:

1. Control apparatus for a turbo-prop aircraft engine having a power turbine and variable pitch propeller driven by said power turbine comprising in combination fuel control means for varying the fuel input to said engine, a governor for sensing the speed of said propeller, blade pitch control means responsive to the speed sensed by said governor for varying the pitch of said propeller blades to obtain the desired propeller speed, and means operatively connecting said blade pitch and fuel control means for synchronously actuating both such means, said actuating means reducing thrust developed by said propeller in a forward power position by decreasing blade pitch while increasing the setting of said fuel control means to maintain a relatively high power turbine speed when said actuating means is retarded from such forward power position.

2. Control apparatus as claimed in claim 1 further comprising means responsive to the speed sensed by said governor for limiting fuel input to said engine to prevent said relatively high power turbine speed from exceeding a preselected maximum value.

3. Control apparatus as claimed in claim 2 wherein said actuating means when retarded from a full forward power position to an intermediate forward power position decreases blade pitch while synchronously decreasing fuel input to said engine when retarded below said intermediate forward power position through a minimum in flight forward power position and into a reverse power position synchronizes further decrease in blade pitch with increase in fuel input to said engine, said increase being limited by said fuel input limiting means.

4. Control apparatus for a turbo-prop aircraft engine having a power turbine which drives a variable pitch propeller comprising in combination:
   (a) fuel control means for supplying a variable fuel rate to said engine,
   (b) an isochronous governor for setting and continuously sensing propeller speed,
   (c) blade pitch control means responsive to underspeeding sensed by said governor for reducing the pitch of said propeller to attempt to restore the propeller speed set by said governor, and
   (d) adjustable power control means operatively connected to said governor, blade pitch control means and fuel control means for synchronously actuating both such means to reduce thrust developed by the propeller by decreasing blade pitch while simultaneously regulating the fuel rate to maintain a relatively high steady power turbine speed when said power control means is retarded through the forward thrust range to the minimum in-flight thrust position.

5. Control apparatus for a turbo-prop aircraft engine as claimed in claim 4 further comprising fuel governing means for limiting the fuel rate to an amount less than that required to produce the speed set in said governor, and blade pitch control means responsive to underspeeding caused by said fuel governing means and sensed by said governor for reducing the pitch of said propeller to an equilibrium pitch and speed as controlled by said limited fuel rate and the position of said power control means.

6. Control apparatus for a free turbine type turbo-prop aircraft engine having a power turbine which drives a variable pitch propeller comprising in combination:
   (a) fuel control means for supplying a variable fuel rate to said engine,
   (b) an isochronous governor for setting and continuously sensing propeller speed,
   (c) fuel topping means for limiting the fuel rate to an amount less than that required to produce the speed set in said governor,
   (d) blade pitch control means responsive to underspeeding caused by said fuel topping means and sensed by said governor for reducing the pitch of said propeller to attempt to restore the propeller speed set by said governor, and
   (e) adjustable power control means operatively connecting said fuel control, fuel topping and blade pitch control means for controlling the thrust produced by said propeller which when retarded to a lower power position in the forward thrust range regulates the blade pitch control means to an equilibrium reduced blade pitch corresponding to the underspeed condition while simultaneously maintaining a high fuel rate as limited by said fuel topping means.

7. Control apparatus as claimed in claim 6 wherein said fuel control means comprising a fuel pump feeding said engine and a variable aperture valve between said pump and said engine, said valve being connected to and actuated by said power control means to decrease the fuel rate as said power control means is retarded from a full forward thrust position to a preselected lower forward thrust position and thereafter to increase such fuel rate as said power control means is retarded further to a minimum in-flight thrust position.

8. Control apparatus for a free turbine type turbo-prop aircraft engine having a power turbine which drives a variable pitch propeller comprising in combination:
   (a) fuel control means for supplying a variable fuel rate to said engine,
   (b) an isochronous governor for setting and continuously sensing propeller speed,
   (c) fuel topping means for limiting the fuel rate to an amount less than that required to produce the speed set in said governor,
   (d) blade pitch control means responsive to underspeeding caused by said fuel topping means and sensed by said governor for reducing the pitch of said propeller to attempt to restore the propeller speed set by said governor, and
   (e) adjustable power control means operatively connecting said fuel control, fuel topping and blade pitch control means for controlling the thrust produced by said propeller, said power control means being adjustable from a full forward thrust position, through a forward thrust range to a minimum in-flight thrust position, and through a reverse range to a full reverse thrust position, said power control means being connected to both said blade pitch and fuel control means so as to reduce thrust by regulating said fuel control means to supply a fuel rate limited by said fuel topping means while simultaneously reducing the pitch of said propeller to the full reverse thrust position when such power control means is retarded from a preselected forward thrust position between the full forward and the minimum-in-flight thrust positions to the full reverse thrust position.

9. Control apparatus as claimed in claim 8 further comprising means for adjusting said power control means to provide a second range of reduced thrust operation from full forward to full reverse thrust, wherein the pitch and fuel rate are controlled in the same manner in both ranges and the second range is selected for ground operation of the aircraft engine.

10. Control apparatus as claimed in claim 8 further comprising means for adjusting the power control means to shift the connection of such linkage relative to said fuel control means for a second range of thrust operation, said second range being selected for ground operation of the aircraft engine.

11. Control apparatus for a turbo-prop aircraft engine having a power turbine and variable pitch propeller driven by said power turbine comprising in combination fuel control means for varying the fuel input to said engine, a governor for sensing the speed of said propeller, blade pitch control means responsive to the speed sensed by said governor for varying the pitch of said propeller to obtain the desired propeller speed, fuel limiting means responsive to the speed sensed by said governor for limiting fuel input to said engine to prevent said propeller speed from exceeding a preselected maximum value, a power control lever for controlling the thrust produced by said propeller, link means connecting said power control lever to both said fuel control and blade pitch control means for synchronously actuating both such means, said link means decreasing both said fuel input and blade pitch when the lever is retarded from a full forward power position to a preselected intermediate forward power lever position, further retardation of said lever below said intermediate position reducing such thrust by decreasing said blade pitch while increasing the setting of said fuel control means to maintain a relatively high power turbine speed sufficient for minimum flight operation requirements at such reduced blade pitch, and means for repositioning said link means between two alternative positions at said intermediate forward power lever position, the first of said positions providing desired propeller speed for flight operations of said engine at said reduced pitch and the second of said positions providing desired minimum engine speed for ground operations, said link means comprising a slotted lever operatively connecting said fuel control means to said power control lever, means for shifting said slotted lever between one of two positions corresponding to said alternative forward power lever positions, and cam means operatively connecting said power control lever and said blade pitch control means, said slotted lever means being angularly fixed and movable along the axis of the slot relative to said cam means, whereby the fuel input setting of said fuel control means may be changed for a given power control lever and blade pitch setting according to the position of said lever with respect to said cam.

References Cited by the Examiner

UNITED STATES PATENTS

| | | | |
|---|---|---|---|
| 1,693,451 | 11/1928 | McCauley et al. | 170—135.74 |
| 2,453,651 | 11/1948 | Mock | 170—135.74 |
| 2,664,958 | 1/1954 | Dancik | 170—135.74 |
| 2,741,087 | 4/1956 | Rubbra | 170—135.74 X |
| 2,941,602 | 6/1960 | Coar | 170—135.74 |
| 3,034,583 | 5/1962 | Best | 170—135.74 |
| 3,155,165 | 11/1964 | Boyer et al. | 170—135.74 |

FOREIGN PATENTS

| | | |
|---|---|---|
| 671,248 | 8/1929 | France. |
| 734,598 | 4/1943 | Germany. |
| 771,077 | 3/1957 | Great Britain. |

MARK NEWMAN, *Primary Examiner.*

W. E. BURNS, *Assistant Examiner.*